(12) United States Patent
Bakker et al.

(10) Patent No.: US 10,337,549 B2
(45) Date of Patent: Jul. 2, 2019

(54) METHOD OF ASSEMBLING A FLOATING STRUCTURE

(71) Applicants: Pultron Composites Limited, Gisborne (NZ); Bellingham Marine Industries Inc., Bellingham, WA (US)

(72) Inventors: Martijn Bakker, Gisborne (NZ); Peter Granville Holdsworth, Te Karaka (NZ); Peter Louis Renshaw, Gisborne (NZ)

(73) Assignees: Pultron Composites Limited, Gisborne (NZ); Bellingham Marine Industries, Bellingham, WA (US)

( * ) Notice: Subject to any disclaimer, the term of this patent is extended or adjusted under 35 U.S.C. 154(b) by 780 days.

(21) Appl. No.: 14/796,791

(22) Filed: Jul. 10, 2015

(65) Prior Publication Data

US 2016/0010724 A1 Jan. 14, 2016

(30) Foreign Application Priority Data

Jul. 10, 2014 (NZ) .................................. 627284

(51) Int. Cl.
*B63C 1/02* (2006.01)
*E02B 3/06* (2006.01)
(Continued)

(52) U.S. Cl.
CPC ............ *F16B 33/006* (2013.01); *B21D 39/00* (2013.01); *B63C 1/02* (2013.01); *B63B 35/34* (2013.01); *B63B 35/38* (2013.01); *E01D 15/14* (2013.01); *E02B 3/064* (2013.01); *F16B 35/005* (2013.01); *F16B 39/021* (2013.01); *F16B 39/04* (2013.01); *F16B 39/12* (2013.01);
(Continued)

(58) Field of Classification Search
CPC ......... Y10T 29/49963; Y10T 29/49948; Y10T 29/49801; F16B 39/12; F16B 39/04; F16B 35/005; B63B 35/34; B63B 35/38; E01D 15/14; B63C 1/02; E02B 3/064; B21D 39/00
See application file for complete search history.

(56) References Cited

U.S. PATENT DOCUMENTS 3,967,569 A * 7/1976 Shorter, Jr. ............. B63B 35/38
114/266
4,043,287 A * 8/1977 Shorter, Jr. ............. B63B 35/38
114/266
(Continued)

OTHER PUBLICATIONS

Notice of the Result of Substantive Examination of a Patent Application dated Sep. 30, 2018 in related GCC Patent Applicaiton No. 29705.

*Primary Examiner* — Jermie E Cozart
(74) *Attorney, Agent, or Firm* — Studebaker & Brackett PC

(57) ABSTRACT

In one aspect the invention provides a nut and tie rod assembly which includes a composite material tie rod defining a main shaft with an exterior surface. The tie rod is formed from reinforcing fibers encapsulated within a matrix material, and at least a portion of the exterior surface of the shaft defines an engagement structure. The assembly also includes at least one nut which includes an internal cavity with an interior surface defining an engagement structure which is complimentary to the engagement structure defined on the exterior surface of the shaft of the tie rod.

10 Claims, 5 Drawing Sheets

(51) Int. Cl.
    *B21D 39/00*     (2006.01)
    *B63B 35/34*     (2006.01)
    *B63B 35/38*     (2006.01)
    *E01D 15/14*     (2006.01)
    *F16B 33/00*     (2006.01)
    *F16B 35/00*     (2006.01)
    *F16B 39/02*     (2006.01)
    *F16B 39/04*     (2006.01)
    *F16B 39/12*     (2006.01)

(52) U.S. Cl.
    CPC .... *Y10T 29/49801* (2015.01); *Y10T 29/49948* (2015.01); *Y10T 29/49963* (2015.01)

(56) References Cited

U.S. PATENT DOCUMENTS

| | | | | |
|---|---|---|---|---|
| 4,070,980 | A * | 1/1978 | Shorter, Jr. | B63B 35/38 |
| | | | | 114/263 |
| 4,559,891 | A * | 12/1985 | Shorter, Jr. | B63B 35/34 |
| | | | | 114/263 |
| 5,529,012 | A * | 6/1996 | Rytand | B63C 1/02 |
| | | | | 114/263 |
| 5,721,047 | A * | 2/1998 | Thicthener | B29C 33/42 |
| | | | | 156/166 |
| 8,955,449 | B2 * | 2/2015 | Falcone | B63B 35/38 |
| | | | | 114/263 |
| 2001/0026746 | A1 * | 10/2001 | Calandra, Jr. | B21K 1/70 |
| | | | | 411/436 |
| 2002/0067957 | A1 * | 6/2002 | Rytand | B63B 5/18 |
| | | | | 405/219 |
| 2003/0150368 | A1 * | 8/2003 | Arias | B63B 35/74 |
| | | | | 114/264 |
| 2003/0177608 | A1 * | 9/2003 | Hozie | B63B 35/36 |
| | | | | 16/367 |
| 2010/0170625 | A1 * | 7/2010 | Liao | C04B 35/83 |
| | | | | 156/148 |

* cited by examiner

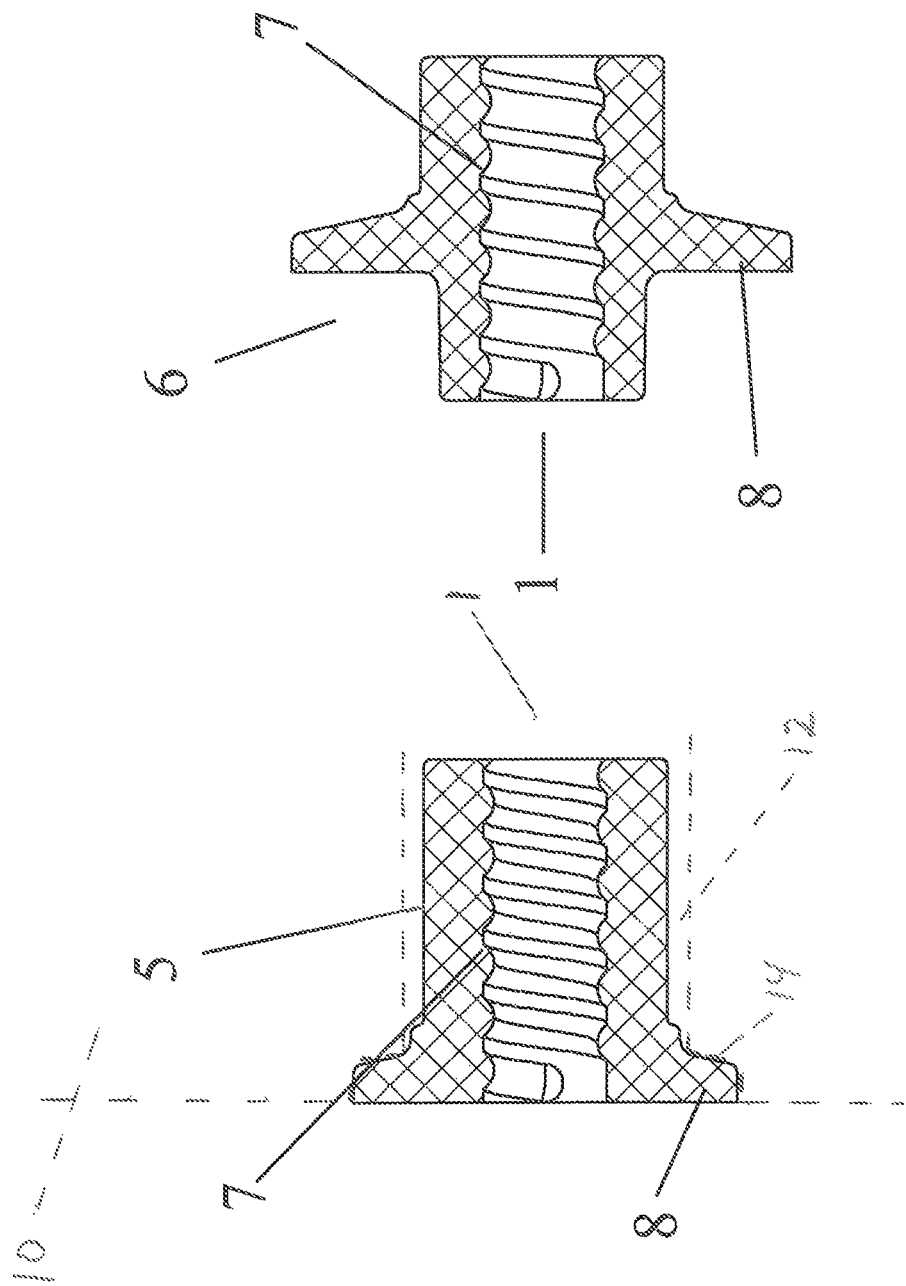

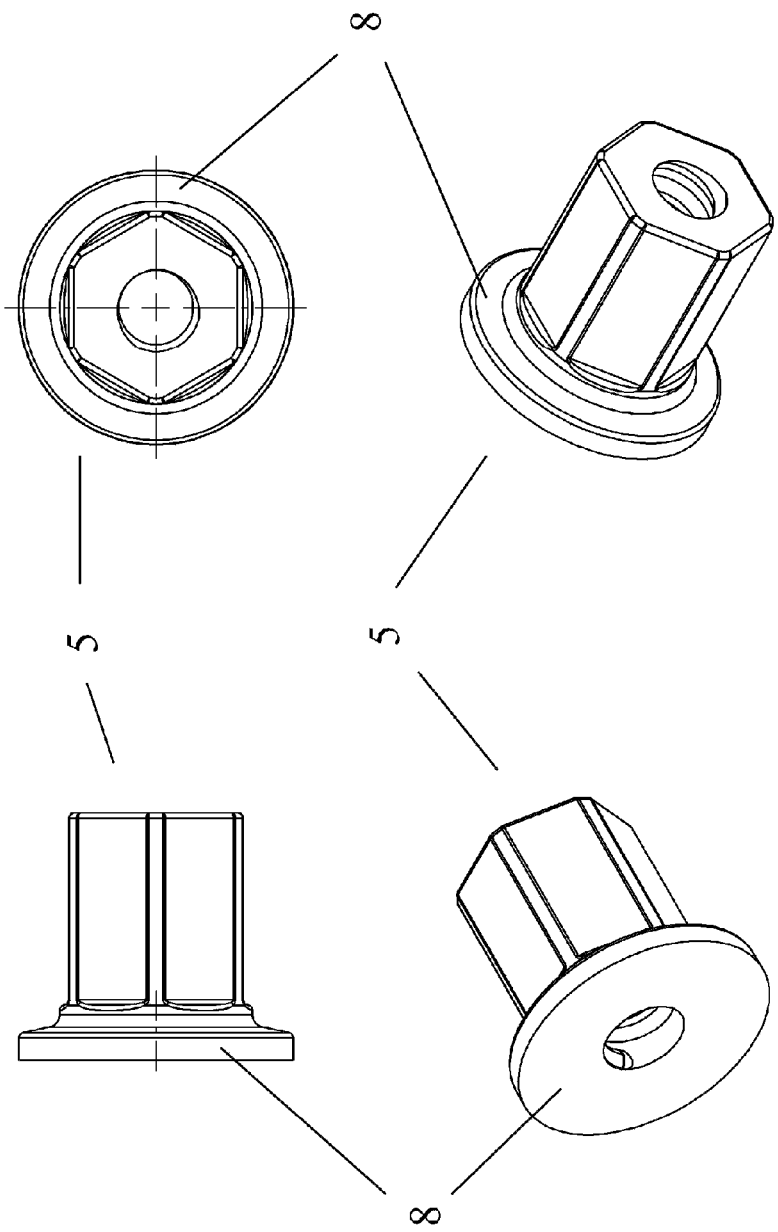

METHOD OF ASSEMBLING A FLOATING STRUCTURE

TECHNICAL FIELD

This invention relates to a nut and tie rod assembly where at least the rod of the assembly is formed from a composite material. A further aspect of the invention relates to a method of assembling a floating structure using this form of nut and composite material tie rod assembly.

BACKGROUND ART

A wide range of structures are assembled from component elements using connection systems. The environments in which a structure is to be deployed can dictate the type of connection system employed in its construction and the ability of the connection system to perform effectively over time.

In the case of floating dock assemblies a number of components need to be fitted together securely. In particular it is common to find floating dock assemblies fitted with a timber waler or whaler beam running along the side of a series of floats and flush with an upper deck surface. These walers are commonly connected to the other components of the floating dock with a tie rod, where the same rod can also be used to lock together additional components of the dock.

Floating dock assemblies are deployed in environments where metallic tie rod systems do not perform well. These docks are constantly exposed to water, and commonly salt water, which corrodes metallic rods and weakens them over time. Wave and wake action also rocks the dock structure frequently—fatiguing and potentially resulting in the failure of the rigid metal rods used to assemble the dock.

In addition, when new timber components are installed the timber will slowly dry out and shrink over time. This drying process results in a loose fit between the timber whaler and the other components of the floating dock. When the same tie rods are used to connect other components together in addition to the timber waler these loose connections can cause serious problems and threaten the structural integrity of the entire dock.

It would therefore be of advantage to have improvements over the prior art which addressed the above issues or at least provided the public with an alternative choice. In particular, it would be of advantage to have a connection system or assembly method which addressed any or all of the above issues in relation to floating structures. A connection system which is resistant to fatigue and corrosion effects and which required minimal on-going maintenance would also be of advantage over the prior art.

DISCLOSURE OF INVENTION

According to one aspect of the present invention there is provided a nut and tie rod assembly which includes
a composite material tie rod defining a main shaft with an exterior surface, at least a portion of the exterior surface of the shaft defining an engagement structure, and
at least one nut which includes an internal cavity with an interior surface defining an engagement structure which is complimentary to the engagement structure defined on the exterior surface of the shaft of the tie rod,
wherein the tie rod is formed from reinforcing fibres encapsulated within a matrix material.

Preferably at least a portion of the exterior surface of the shaft defining an engagement structure formed by a thread.

Preferably the interior cavity of the nut defines a thread complimentary to a thread defined on the exterior surface of the shaft of the tie rod.

According to another aspect of the present invention there is provided a nut and tie rod assembly which includes
a composite material tie rod defining a main shaft with an exterior surface, at least a portion of the exterior surface of the shaft defining a thread, and at least one nut which includes an internal cavity with an interior surface defining a thread complimentary to a thread defined on the exterior surface of the shaft of the tie rod,
wherein the tie rod is formed from reinforcing fibres encapsulated within a matrix material.

According to a further aspect of the present invention there is provided a nut and tie rod assembly substantially as described above wherein the tie rod is formed from reinforcing fibres encapsulated in a polymer matrix material.

According to yet another aspect of the present invention there is provided a nut and tie rod assembly substantially as described above wherein the composite material rod has an elastic character.

According to a yet further aspect of the present invention there is provided a nut and tie rod assembly substantially as described above wherein the composite material tie rod has a corrosion resistant character.

According to another aspect of the present invention there is provided a method of assembling a floating structure characterised by the step of bolting together at least two components of the floating structure using at least one nut and composite material tie rod.

According to a further aspect of the present invention there is provided a method of assembling a floating structure characterised by the steps of
i. forming at least one tie rod hole through a waler to be connected to the floating structure,
ii. forming or otherwise providing a recess arranged to receive a nut at one end of the tie rod hole, and
iii. Connecting the waler to a further component of the floating structure by inserting the shaft of a composite material tie rod through the tie rod hole and engaging the tie rod shaft with a nut located within the recess formed at one end of the tie rod hole.

According to yet another aspect of the present invention there is provided a method of assembling a floating structure substantially as described above further characterised by the additional step of rotating the nut on the tie rod shaft to contact a bearing flange formed on the nut with the lower of face of the recess formed in the waler.

In alternative aspects the waler may be any member of a structure being a known equivalent to the waler.

The waler or alternative may comprise wood an/or another known equivalent material. For example in some instances the waler may be formed from composite materials such as various forms and combinations of polymers, plastics and/or resins.

The present invention is arranged to provide a nut and tie rod assembly, with at least the tie rod being formed from a composite material. A further aspect of the present invention relates to the provision of a method of assembling a floating structure with the use of this nut and composite material tie rod assembly.

Reference in general throughout this specification will be made predominantly to the invention providing a nut and rod assembly. However those skilled in the art will appreciate that the invention includes additional aspects such as the structure assembly method, and reference to nut and tie rod assembly in isolation should in no way be seen as limiting.

The rod provided by the invention includes a main shaft which in preferred embodiments is provided with a substantially straight form and a circular cross-section. At least one section or area of the exterior of this tie rod defines an engagement structure used to cooperate with a complimentary engagement structure formed on a nut. In preferred embodiments at least one section or area of the exterior of the tie rod defines an engagement structure formed by a thread.

In a preferred embodiment a thread provided on the tie rod may be located at one end of the rod. In various embodiments a threaded section may be provided at both opposed ends of the tie rod, or alternatively at one end only opposed to a bearing flange or similar blocking member formed on the opposite end of the rod.

Reference in general throughout this specification will be made to a rod being provided with threaded sections at both ends. Again however those skilled in the art will appreciate that other configurations or arrangements of threads are also within the scope of the invention. In particular a thread at only one end of a rod is also within the scope of the invention.

Also in particular some embodiments of the invention may use a system which does not rely on a nut and thread provided on the rod. Those skilled in the art will appreciate that engagement structures other than threads may be provided in other embodiments. For example, some embodiments may, instead of a rod with a helical thread, have a rod with a ring, or series of rings, and the fastener may be forced on to create an interference fit. In alternative arrangements a projecting ring may be formed in the interior of a nut, with a complimentary circular recess being provided at one of more points along the length of the rod. In yet other embodiments complimentary engagement structures may operate with a two-part system which could be placed over the rod and clamped together by a third part, or may—for example—be provided by a locking pin which slots through complimentary apertures formed in both a nut and the shaft of the rod. In a further embodiment a section—or all—of the exterior surface of the rod may be roughened, with the complimentary engagement structure of the nut being formed by an adhesive applied within the internal cavity of the nut. In such embodiments the adhesive applied within the internal cavity will mould around the roughened surface of the rod and once set will provide a complimentary engagement structure to that provided by the roughened surface of the rod.

Reference in general throughout this specification will however be made to the complimentary engagement structures used by the invention being complimentary helical threads. However those skilled in the art will appreciate that other connection mechanisms are also within the scope of the invention.

A thread applied to the exterior of the rod will have a substantially helical spiral form which corresponds with a complimentary thread formed in the interior cavity of an associated nut. These threads function in a well-known manner to translate rotational motion of the rod or nut into relative longitudinal motion.

In a preferred embodiment a thread formed on either the tie rod or the nut may have an attenuated or half rope thread configuration. Full rope thread arrangements have a wave-like or sinusoidal profile, whereas a half rope thread incorporates a series of flattened peaks which attenuate the extent or width of the thread projecting from the shaft. This half rope thread minimises the amount of material which needs to be removed from the shaft, thereby maximising the final diameter of the shaft and its resulting tensile and shear strength.

Furthermore this form of thread has relatively shallow angles which re-directs some of the shear stress exerted on the shaft into hoop stress in the nut. These hoop stresses in turn induce radial compressive stresses in the shaft. Radial stresses induced in the shaft increase resistance to shear failure of the axial unidirectional load bearing fibres of the shaft thus providing increased resistance to failure at the shaft/rod zone which is the weakest link in the composite system. During the tensioning process the nut may also deform slightly due to the induced compressive loads and hoop stresses. This deformation redistributes point loads on the thread evenly over all the thread thus minimizing stress concentration within the shaft/rod zone and improving the life of the connector system. The thickness of the nut is also increased in such embodiments to withstand the increased radial or hoop stresses generated.

A rod provided by the invention is formed from a composite material. This composite material incorporates reinforcing fibres moulded within an encapsulating matrix material.

Preferably the reinforcing fibres integrated into the matrix material are elastic and to a degree resilient, providing the rod with an elastic character. Those skilled in the art will appreciate that the term 'elastic character' when used in conjunction with the invention means that the material can stretch and retract to at least a limited degree. This characteristic of the rod allows it to accommodate shrinkage or expansion of the materials it connects together. For example in the case of new waler timbers bolted to the structure of a floating dock these timbers will slowly shrink as they dry out, reducing the distance to be spanned by the length of the tie rod. The elastic character of the tie rod shrinks the length of the rod in these circumstances to maintain a firm connection between the ends of the rod, any associated nut and the materials to be held in position.

In a preferred embodiment the fibres encapsulated within the rod may be formed from glass or fibreglass material. Glass reinforcing fibres provide the rod with the elastic character required in applications where shrinkage or expansion of materials is anticipated.

Reference throughout this specification will also be made to the reinforcing rod fibres being formed from glass. However those skilled in the art will also appreciate that other types of fibres—such as for example carbon, aramid or any equivalent materials—may also be used in conjunction with the present invention.

In a preferred embodiment the encapsulating matrix material used to form a rod may be formed from any one or combination thereof of polymers such as epoxy, polyurethane, polyester or vinyl ester for example. These materials perform well in harsh environments where metals would normally corrode, while will also providing the resulting tie rod shaft with significant strength.

Reference in general throughout this specification will also be made to a tie rod being formed from a fibre reinforced polymer rod or shaft. Again however those skilled in the art will appreciate that other types of encapsulation matrix materials may be employed with various embodiments of the invention.

The use of fibre reinforced rod materials provides the resulting tie rod with a degree of elasticity in addition to resistance to corrosion effects.

Furthermore the elastic character of the rod provides resistance to fatigue, particularly in applications where the materials being connected are subject to movement. These materials are also electrical insulators and can be used in applications where electrical isolation is desirable in a connection assembly.

In a preferred embodiment a nut provided for engagement with the composite material rod may itself be formed from a composite material. For example, in a preferred embodiment a nut provided for use with the invention may be formed from fibreglass reinforced nylon and/or glass reinforced nylon and/or glass filled nylon. Again these materials exhibit electrical insulation and corrosion resistance properties which can be useful in various applications.

In a preferred embodiment a nut provided in accordance with the invention may be formed from or by a lock nut. Due to the resilient character of the tie rod any shrinkage in the materials being connected is compensated for by the rod reducing its own length. A lock nut therefore permanently engages the nut and rod assembly, preventing tampering and reducing the need for maintenance operations to retighten loosened nuts.

In a preferred embodiment a nut may form or define a perimeter bearing flange at the face of the nut which is initially to engage with the end of the rod. This perimeter bearing flange may therefore function as an integral washer for the combined nut and the rod, increasing the exposed surface area of the nut engaged with one of the materials being bolted together. This bearing flange can function in much the same way as a washer, evenly spreading the force applied by the nut into the material being connected.

As indicated above a further aspect of the present invention provides for a method of assembling a floating structure using the nut and tie rod assembly referenced above. This aspect of the invention may be enabled by various arrangements and configurations of the invention's nut and rod assembly, whether they require a single nut per rod or a nut deployed at either end of a rod.

In preferred embodiments the invention may facilitate the bolting or tying of wooden components to a floating structure where these wooden components are used to form a gunwale or whaler for the structure.

In such preferred embodiments the sections of timber used to form the waler can have a number of rod holes drilled through them to receive the shafts of the rods.

Once the required numbers of rod holes have been drilled a recess may be formed at one end of each tie rod hole. These recesses can receive a nut to be threaded or screwed onto the end of a composite material tie rod. In preferred embodiments the depth or extent of this recess may receive the entire height or extent of a nut, providing a flat flush exterior surface for the waler. The recess and rod hole formed in the timber waler can then be used to receive the shaft of a rod and its terminating nut, with the nut threaded on to the rod to engage the waler with an adjacent component of the floating structure.

In a preferred embodiment a nut used with the invention in this application may also incorporate or define a perimeter bearing flange substantially as discussed above. In these embodiments the nut can be screwed down on the shaft to contact this bearing flange with the lower face of the recess formed in the timber waler. The increased surface area contact between the washer like bearing flange can then firmly engage the waler against the components of the structure to be connected. Adequate tightening of the nut also stretches the shaft of the rod to take into account any later shrinkage of the timber waler as it dries out with age.

The present invention may provide many potential advantages over the prior art connectors and connection systems.

The present invention also facilitates a method of assembling a floating structure which combats the fatigue and corrosion problems associated with the use of existing metallic rod connectors.

A nut and rod assembly provided by the invention in preferred embodiments presents a polymer exterior surface to both the components that it connects together and the local environment in which it is deployed. These polymer materials are highly resistant to the corrosive effects of water—and salt water in particular—while also exhibiting high levels of electrical insulation so as to not promote galvanic corrosion which would occur in a we or marine environment.

The elastic character of the tie rod provided by the invention maintains a firm connection between the components of a structure even after these components have shrunk or expanded over time. The invention therefore ensures that these shrinkage and expansion problems are mitigated while also minimising any subsequent maintenance work required with prior art systems to retighten nuts. Furthermore this elastic character also mitigates fatigue effects to increase the useful lifespan of the rod, particularly when it is subjected to periodic motion.

The assembly method facilitated for floating structures can also be employed to securely attach timber walers to the sides of such structures. Recesses provided at the ends of rod holes can receive entire connecting nuts, presenting a flat exterior surface for the waler. In various embodiments the inclusion of a perimeter bearing flange within these nuts provides a strong and secure engagement between the waler, nut and associated rod.

BRIEF DESCRIPTION OF THE DRAWINGS

Additional and further aspects of the present invention will be apparent to the reader from the following description of an embodiment of the invention, given in by way of example only, with reference to the accompanying drawings in which:

FIGS. 5a-5d show side, end, rear perspective and front perspective views of the nut illustrated with respect to FIG. 3, and FIGS. 6a-6d show side, end, rear perspective and front perspective views of the nut illustrated with respect to FIG. 4.

Further aspects of the invention will become apparent from the following description of the invention which is given by way of example only of particular embodiments.

BEST MODES FOR CARRYING OUT THE INVENTION

Figure 1:
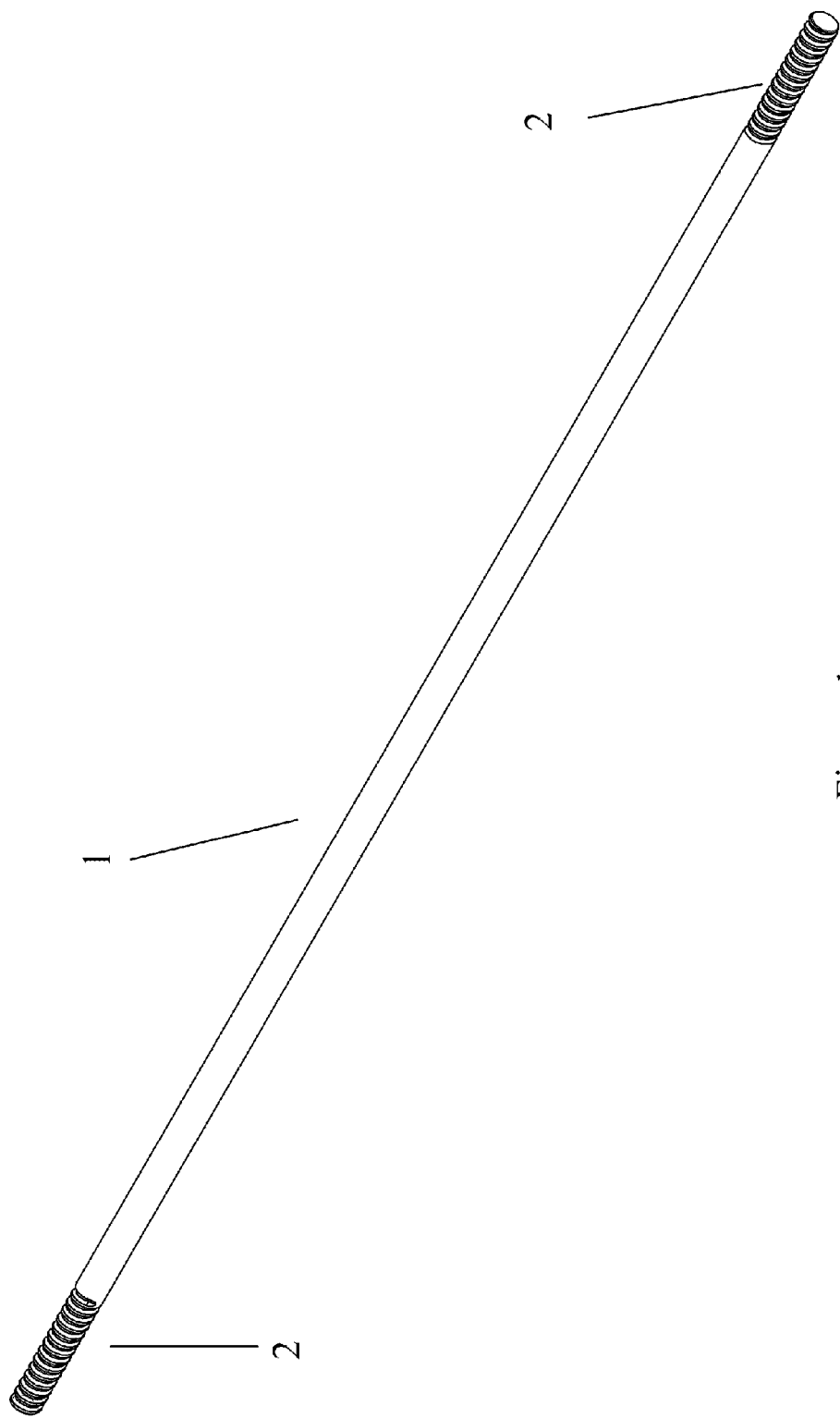
FIG. 1 shows a perspective view of a tie rod provided in accordance with a preferred embodiment of the invention.
Figure 2:
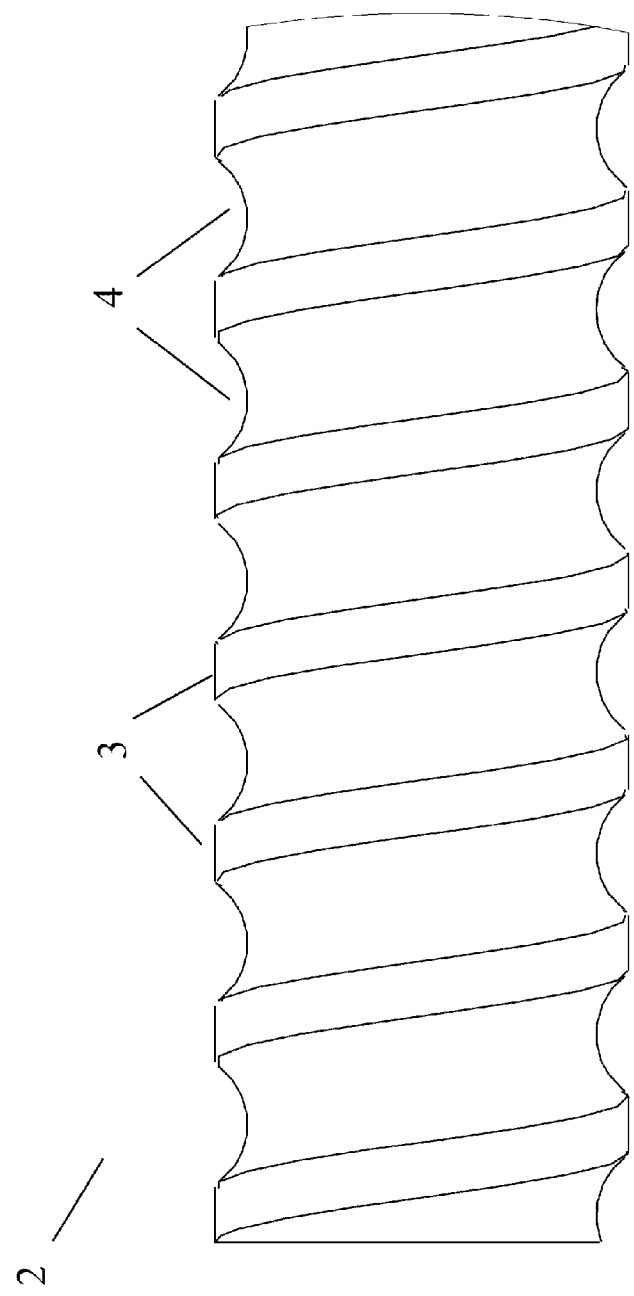
FIG. 2 shows an enlarged side view of one end of the tie rod illustrated by FIG. 1, and FIGS. 3 and 4 show side cross section views of the end of the tie rod of the embodiment of FIG. 1 engaged with two difference types of nut.
Figures 6A, 6B, 6C, 6D:
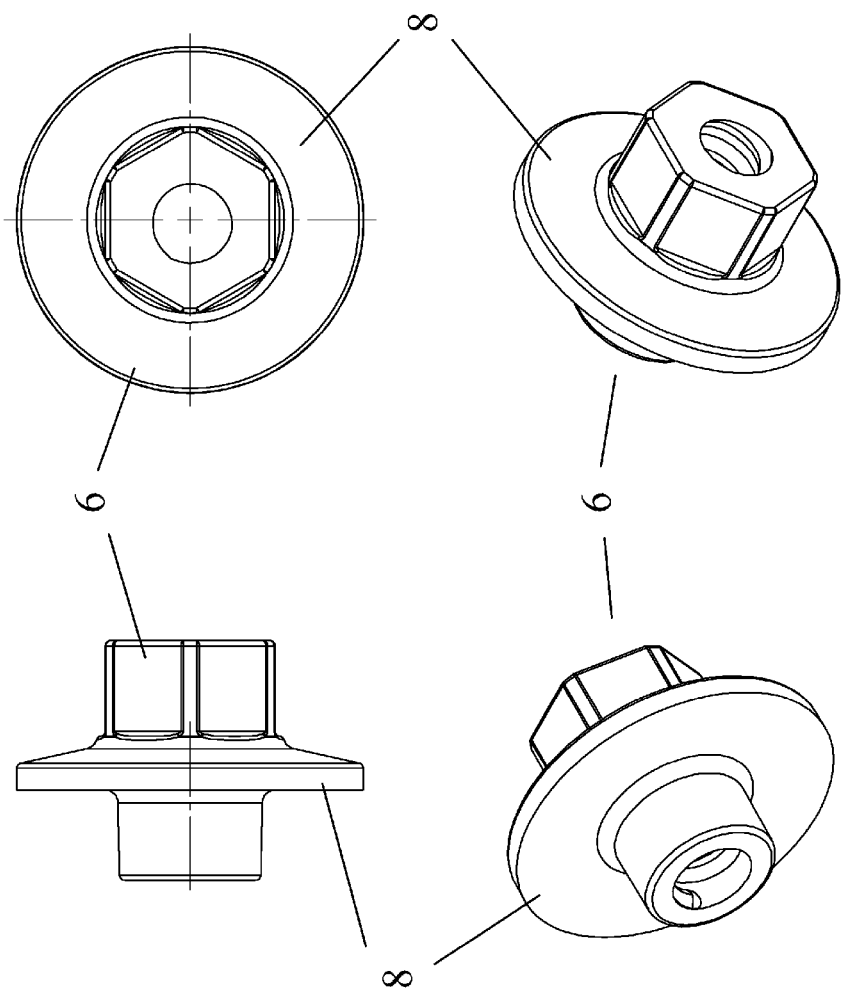

FIGS. 1 through 6 show a number of components of a nut and tie rod assembly as provided in accordance with a preferred embodiment of the invention. FIGS. 1 and 2 show the form of a composite material tie rod 1 provided with the assembly, while FIGS. 3 through 6 illustrate two different forms of nuts which can be engaged with the ends of this tie rod.

The tie rod 1 defines a main shaft where the two ends of the exterior surface of the shaft define a pair of engagement structures in the form of threads 2. This tie rod is formed from reinforcing glass fibres encapsulated in a thermoset polymer matrix material. This composite material provides the tie rod with an elastic and corrosion resistant character.

FIG. 2 shows an enlarged side view of one end of the tie rod 1 and the thread 2 formed in its exterior surface. As can be seen from FIG. 2 the thread has an attenuated or half rope configuration. The half rope thread incorporates a series of flattened peaks 3 when compared to the remaining curved troughs 4. The attenuated peaks reduce the extent to which the thread extends into the body the shaft.

FIGS. 3 and 4 show side cross section views of the end of the tie rod 1 engaged with two difference types of nut 5, 6. According to a further aspect of the present invention there is provided a method of assembling a floating structure characterised by the steps of i. forming at least one tie rod hole 12 through a waler 10 to be connected to the floating structure, ii. forming or otherwise providing a recess 14 arranged to receive a nut at one end of the tie rod hole 12, and iii. connecting the waler 10 to a further component of the floating structure by inserting the shaft of a composite material tie rod 1 through the tie rod hole 12 and engaging the tie rod shaft with a nut 5 located within the recess 14 formed at one end of the tie rod hole 12.

Each of FIGS. 5 *a-d* and 6 *a-d* provide side, end, rear perspective and front perspective views of each nut.

Each nut 5, 6 includes an internal cavity with an interior surface defining a thread 7 complimentary to a thread 2 defined at either end of the tie rod 1. As can be seen from FIGS. 3 and 4 this thread is an inverted half rope thread.

The base of each nut 5, 6 also defines a perimeter bearing flange 8. As can be seen from FIGS. 5 and 6 in particular, this flange 8 extends away laterally from the main body of the nut to act as a washer when engaged with the surface of a component to be connected by the assembly.

Some embodiments of the present invention comprise a bolt or threaded rod in place of a tie rod having a thread at two ends of a rod.

In the preceding description and the following claims the word "comprise" or equivalent variations thereof is used in an inclusive sense to specify the presence of the stated feature or features. This term does not preclude the presence or addition of further features in various embodiments.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claim is:

1. A method of assembling a floating structure by bolting together a waler and at least one further component of the floating structure using at least one nut and composite material tie rod, the composite material tie rod having an elastic character accommodating shrinkage or expansion in the waler and the further component bolted together by the composite material tie rod, the method comprising the steps of:
   inserting a shaft of the composite material tie rod through a tie rod hole formed in the waler,
   engaging the tie rod shaft with a nut by rotating the nut on the shaft of the tie rod to bear against the waler, and
   over-tightening the nut to stretch the length of the tie rod to allow for later expansion or shrinkage of the waler with the nut continuing to bear against the waler during the later expansion or shrinkage of the waler.

2. The method of assembling a floating structure as claimed in claim 1, wherein the composite material tie rod is a polymer matrix material and fibers.

3. The method of assembling a floating structure as claimed in claim 2, wherein the fibers are glass or fiberglass.

4. The method of assembling a floating structure as claimed in claim 1, wherein the nut incorporates or defines a perimeter bearing flange.

5. The method of assembling a floating structure as claimed in claim 4, wherein the nut is screwed down on the shaft to contact the perimeter bearing flange of the nut with one of the at least two components of the floating structure.

6. A method of assembling a floating structure comprising the steps of:
   forming at least one tie rod hole through a waler to be connected to the floating structure,
   forming a recess in the waler arranged to receive a nut at one end of the tie rod hole,
   connecting the waler to a further component of the floating structure by inserting the shaft of a composite material tie rod through the tie rod hole and engaging the tie rod shaft with a nut located within the recess formed at one end of the tie rod hole, the composite material tie rod having an elastic character accommodating shrinkage or expansion in the waler,
   rotating the nut on the shaft of the tie rod to bear against a surface of the recess, and
   over-tightening the nut to stretch the length of the tie rod to allow for later expansion or shrinkage of the waler with the nut continuing to bear against the surface of the recess formed in the waler during the later expansion or shrinkage of the waler.

7. The method of assembling a floating structure as claimed in claim 6 wherein the depth of the recess formed in the waler is arranged to receive the entire nut.

8. The method of assembling a floating structure as claimed in claim 6 wherein the nut incorporates or defines a perimeter bearing flange.

9. The method of assembling a floating structure as claimed in claim 6, wherein the composite material tie rod is a polymer matrix material and fibers.

10. The method of assembling a floating structure as claimed in claim 9, wherein the fibers are glass or fiberglass.

* * * * *